US012430396B2

(12) United States Patent
Gopaldas Totale et al.

(10) Patent No.: US 12,430,396 B2
(45) Date of Patent: *Sep. 30, 2025

(54) METHOD AND SYSTEM FOR NAVIGATION CONTROL TO SELECT A TARGET PAGE FROM POSSIBLE TARGET PAGES

(71) Applicant: Open Text Corporation, Waterloo (CA)

(72) Inventors: Sachin Gopaldas Totale, Pleasanton, CA (US); Vikas D. Kulkarni, Bangalore (IN); Sandhya Manchala, Bangalore (IN)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,092

(22) Filed: Sep. 27, 2023

(65) Prior Publication Data

US 2024/0020350 A1    Jan. 18, 2024

Related U.S. Application Data

(63) Continuation of application No. 17/467,004, filed on Sep. 3, 2021, now Pat. No. 11,803,609, which is a continuation of application No. 14/585,842, filed on Dec. 30, 2014, now Pat. No. 11,113,359.

(51) Int. Cl.
*G06F 16/958* (2019.01)
*G06F 40/14* (2020.01)

(52) U.S. Cl.
CPC ............ *G06F 16/986* (2019.01); *G06F 40/14* (2020.01)

(58) Field of Classification Search
None
See application file for complete search history.

(56) References Cited

U.S. PATENT DOCUMENTS

| 7,325,201 | B2 * | 1/2008 | Ferrari | G06F 16/954 |
| | | | | 707/999.002 |
| 9,075,777 | B1 * | 7/2015 | Pope | G06F 16/9566 |
| 9,239,878 | B2 * | 1/2016 | Kattil Cherian | G06F 40/143 |
| 9,798,524 | B1 * | 10/2017 | Colton | G06F 16/972 |
| 2002/0165960 | A1 * | 11/2002 | Chan | G06F 21/604 |
| | | | | 709/225 |
| 2013/0014019 | A1 * | 1/2013 | Kim | G06F 16/9577 |
| | | | | 715/738 |
| 2014/0095583 | A1 * | 4/2014 | Houle | G06F 16/9577 |
| | | | | 709/203 |
| 2014/0173415 | A1 * | 6/2014 | Kattil Cherian | H04L 41/069 |
| | | | | 715/234 |

(Continued)

*Primary Examiner* — Ariel Mercado-Vargas
(74) *Attorney, Agent, or Firm* — Sprinkle IP Law Group

(57) ABSTRACT

In general, the technology relates to navigation control in a web application that includes receiving an event of a navigation trigger in a first page of a web application, and obtaining, in response to the event, an expression for the navigation trigger. The technology further includes gathering data from a first data source specified by the expression. The technology further includes evaluating the expression using the data to select a second page from a set of possible target pages, where each of the possible target pages is separately pre-stored in a data repository. The technology further includes presenting the second page.

22 Claims, 7 Drawing Sheets

(56) References Cited

U.S. PATENT DOCUMENTS

| | | | | |
|---|---|---|---|---|
| 2015/0046900 A1* | 2/2015 | Eldridge | ............... | G06F 8/34 |
| | | | | 717/105 |
| 2015/0106691 A1* | 4/2015 | Arzuffi | ............... | G06F 40/143 |
| | | | | 715/234 |

* cited by examiner

Application Dashboard — 508

| Employee ID | Employee Name | Object ID |
|---|---|---|
| 12,345 | Anand | 0801e2408003ec1e |
| 123 | Kalam | 0801e2408003ec1e |
| 12,345 | Anand | 0801e2408003ec1f |
| 1 | Vikas | 0801e2408003ec20 |
| 2 | Sachin | 0801e2408003ec21 |
| 3 | Sandhya | 0801e2408003ec22 |
| 12,345 | Anand | 0801e2408003f3b4 |

Get Employee Details

| Manager Name | Manager ID | Object ID |
|---|---|---|
| Prasad | 11 | 0801e2408003ec23 |
| Sunil | 22 | 0801e2408003ec24 |
| Sheetal | 33 | 0801e2408003ec25 |

602

Manager Page: [ edit_manager ] — 520

[ Get Manager Details ]   [ Create & Navigate ]

Application Dashboard

Manager ID: [_____]

Manager Name: [_____]

[ Save ]

*FIG. 7*

METHOD AND SYSTEM FOR NAVIGATION CONTROL TO SELECT A TARGET PAGE FROM POSSIBLE TARGET PAGES

CROSS-REFERENCE TO RELATED APPLICATION(S)

This application is a continuation of and claims a benefit of priority under 35 U.S.C. 120 from U.S. patent application Ser. No. 17/467,004 filed Sep. 3, 2021, entitled "METHOD AND SYSTEM FOR NAVIGATION CONTROL TO SELECT A TARGET PAGE FROM POSSIBLE TARGET PAGES," issued as U.S. Pat. No. 11,803,609, which is a continuation of and claims a benefit of priority under 35 U.S.C. 120 from U.S. patent application Ser. No. 14/585,842 filed Dec. 30, 2014, issued as U.S. Pat. No. 11,113,359, entitled "METHOD AND SYSTEM FOR NAVIGATION CONTROL," which are hereby fully incorporated herein by reference for all purposes.

BACKGROUND

A network is a set of interconnected computing devices that may communicate with each other. Web applications are applications that are developed for the network that includes a series of pages. Each page may include a button or other navigation control that links to another page in the series of pages.

BRIEF DESCRIPTION OF DRAWINGS

FIGS. 5-7 shows an example in accordance with one or more embodiments of the technology.

DETAILED DESCRIPTION

Figure 1:
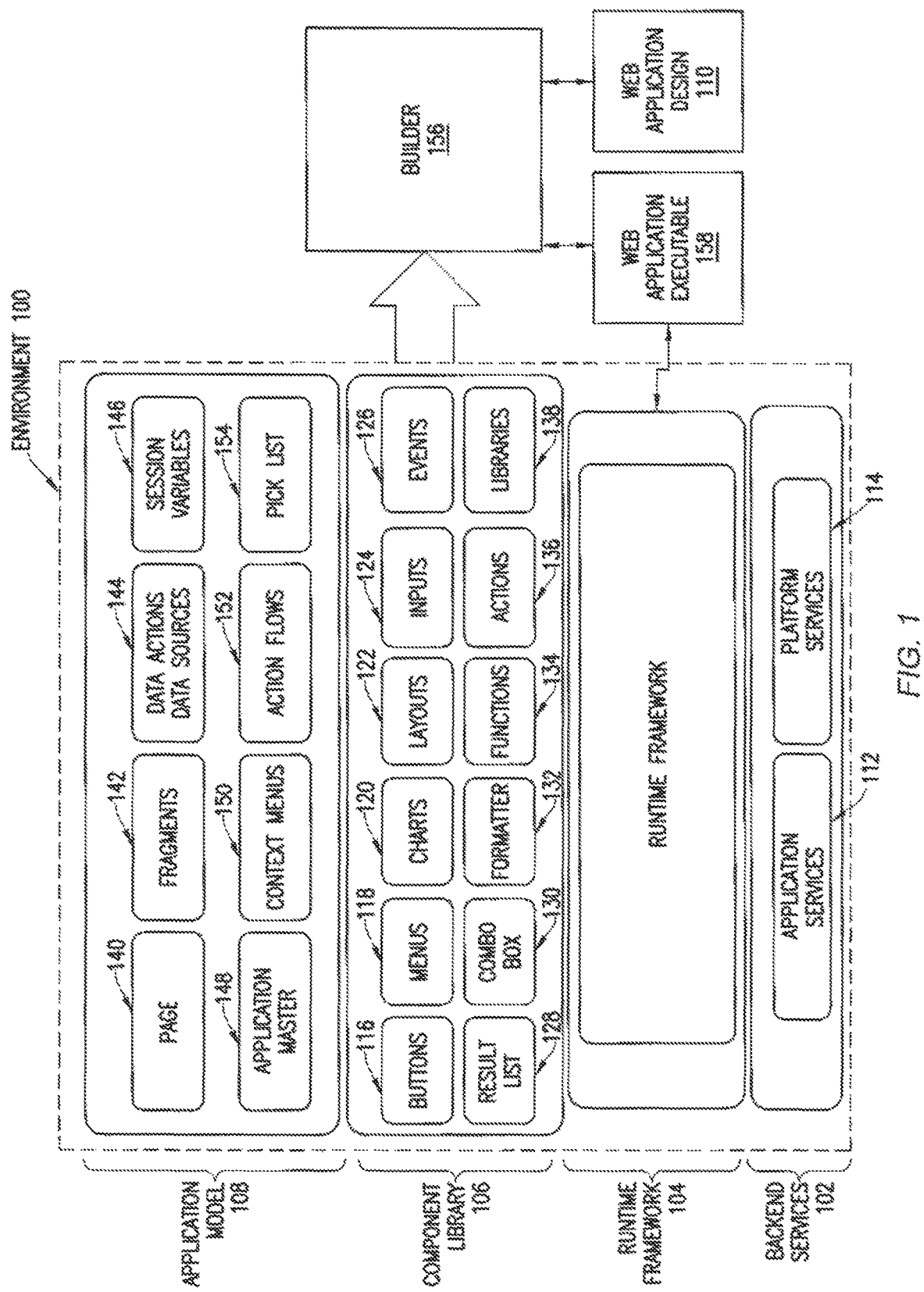
FIGS. 1 and 2 show example schematic diagrams in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to including expressions in navigation triggers of web applications. In particular, within the code of a navigation trigger is an expression that specifies a data source. Data from the data source may be used to evaluate the expression. The result of the evaluation defines the target web page from a set of possible target pages.

The term, "web application" is used in the present application to generically refer to the web application executable, the web application design, or another form of the web application. Web applications include pages. A target page is a complete and independently stored document from other pages in the set of possible target pages. In other words, the code of the target page and the code in other possible target pages are different. In one or more embodiments, the difference may be with respect to the entirety of the target page. In other embodiments, the difference may be with respect to the body of the target page. When the difference is with respect to the body of the target page, header and other themes of the target page may have the same code. Other embodiments exist without departing from the scope of the technology. Further, the target page is pre-stored in the data repository prior to the evaluation of the expression. Thus, the target page exists prior to the request to obtain the target page. In one or more embodiments of the technology, the data that is populated on the target page may be the same as data populated on other possible target pages. For example, one possible target page may include code to display, without an editing capability, an individual's name and address as stored in a database, while another possible target page may include code to display the individual's name and address and code to permit editing of the aforementioned information.

As used in the detailed description and claims, a developer is an individual or group of individuals that creates a web application design. An end user is an individual or group of individuals that uses the web application once the web application is developed. Further, an individual or group is deemed to perform an action when an action is performed on behalf of the individual. The entity performing the action may be one or more other individuals, an organization, a device, or a combination thereof.

FIG. 1 shows a schematic diagram of a system in accordance with one or more embodiments of the technology. Specifically, FIG. 1 shows a schematic diagram of an environment (100) for developing a web application design (110) and executing a web application executable (158) created from the web application design (110) in accordance with one or more embodiments of the technology. As shown in FIG. 1, the environment (100) includes backend services (102), a runtime framework (104), a component library (106), and an application model (108). Each of the aforementioned components is described below.

In one or more embodiments of the technology, backend services (102) are services that are not shown to the developer and ease the development of the web application design (110). The backend services (102) may include application services (112) and platform services (114). In one or more embodiments of the technology, the application services (102) allow a user interface based web application to be built on top of a generic model of a web application.

In one or more embodiments of the technology, the platform services (114) are services that manage the application for multiple different platforms. The multiple different platforms may have heterogeneous operating systems, devices, and/or display device sizes.

In one or more embodiments of the technology, the runtime framework (104) provides a runtime environment for a web application executable (158). Specifically, the runtime framework (104) manages the data and events of the executing web application executable (158). The runtime framework (104) is described in FIG. 2 and below.

In one or more embodiments of the technology, the component library (106) is a library of application components that a developer may add to the web application design (110). In other words, the developer may select components from the component library (106) to add functionality to the web application design (110). The components library (106) may include user interface components and processing components.

In one or more embodiments of the technology, user interface components are components that are displayed to an end user. In other words, instances of the user interface components are displayed on a display device. In one or more embodiments of the technology, the user interface components may include, but are not limited to, buttons (116) (e.g., radio buttons, common button), menus (118) (e.g., drop down menu, check boxes), charts (120), layouts (122), inputs (e.g., fields) (124) and combo boxes (130). User interface components in the component library may each be associated with a set of options. The set of options define the execution of the user interface component. Namely, the set of options define how a particular instance of the component is executed. Options associated with the user interface components may include formatting, any text that is displayed, any action that is to be performed when the user interface component is selected, other options, and/or any combination thereof. The action may be to: perform an operation on the page, transition to a specific static page, evaluate an expression to determine the page for transitioning, and/or perform another operation.

In one or more embodiments of the technology, the expression may specify one or more data sources and operations to perform on the data from one or more data sources. A data source is a location of data that is not within the expression. For example, the data source may be another portion of the application page or a data repository. For example, another portion of the application page may be a text field, drop down menu option, or other option. Data from the data source is used to evaluate the operations in the expression. For example, the operation may include a conditional statement based on the data obtained. By way of another example, the operation may be to perform an end user submitted action specified in another field of the page. The result of evaluating the expression is the target page that is selected.

In one or more embodiments of the technology, the processing components are components that are hidden to the end user (i.e., are not displayed to the end user). For example, the processing components may include events (126), result lists (128), formatter (132), functions (134), actions (136), and libraries (138). Each of the processing components are discussed below.

Formatter (132) are instructions which enable arranging of the data in specific formats in accordance with one or more embodiments of the technology. A formatter may be applied to number, date time values, other values, or a combination thereof. In accordance with one or more embodiments of the technology, functions (134) are the re-usable piece of code, which take a set of inputs and return an output. Examples of functions include concat, substring, min, max, and other functions.

In accordance with one or more embodiments of the technology, an action (136) is a piece of reusable executable functionality that can be abstracted out of any particular component so that the action may be usefully shared among multiple pages and/or context menus. Example actions include update, delete, create, check-in, checkout, download, and other actions.

In accordance with one or more embodiments of the technology, a library is a group of files which constitute utility and infrastructure code. Example libraries include application startup code, action manager, type manager, utility, and logger. The processing components may also each be associated with a set of options that define how processing components are used.

In one or more embodiments of the technology, an application model (108) is a generic model for any web application. The application model includes pages (140), fragments (142), data actions and data sources (144), session variables (146), application master (148), context menus (150), action flows (152), and a pick list (154). Each of these components of the application model is described below.

A page (140) in the application model (108) is a template for a web page. In other words, a page in the application model (108) is a template for a complete and individual document that is displayable to the end user. A fragment (142) represents at least a portion of an activity. In other words, an activity is a defined sequence of actions that an end user may perform using the web application. A fragment is a portion of the defined sequence of actions. Data actions and data sources (144) define the storage structure and storage location of the data and the actions to perform on the data.

Session variables (146) are the variables stored for a particular session between the end user and the web application executable (158). For example, session variables (146) may include connection variables and information about the end user, such as the user's credentials (e.g., user identifier), role of the end user, and other information.

The application master (148) defines the global look and feel of the web application in accordance with one or more embodiments of the technology. For example, the application master (148) may include various banners, menu items, fonts, colors, and other features that are displayed and surround the individual pages. By way of another example, the application master (148) may include a template on which the pages (140) are based.

Context menus (150) are instances of menus that are dependent on the context in which the menu is selected. For example, the context may be a particular user interface component that is selected, the page that is displayed, or another context. The context menu presents options that are specific to the particular context. The manner of selecting the context menu is not dependent on the context. Specifically, an end user may select the context menu in the same way and have different menu options presented based on the context.

Action flows (152) are a sequence of actions that are performed. Action flows may or may not have user interaction. For example, an action flow may be completely automatic. By way of another example, an action flow may be a defined sequence of actions by which a user is guided using the web application.

In one or more embodiments of the technology, a pick list (154) is a list of displayed items from which a set of items may be selected. In other words, more than one displayed item may be selected from a pick list.

The web application design (110) is a particular design of a web application created by a developer. Specifically, the web application design (110) includes instances of the components of the application model (108) and component library (106), may execute on the runtime environment (104) and use the backend services (102).

The web application design (110) is connected to a builder (156) in accordance with one or more embodiments of the technology. The builder (156) provides a user interface for a developer to create the web application design (110). In some embodiments, the developer does not need to know programming languages or other development knowledge to build the web application design. Rather, the builder (156) provides an interface by which the developer can primarily drag and drop components into a web application design (110), and enter parameters into fields to create the web application design (110). Thus, in some embodiments, a developer may be a business analyst rather than have any training in application development using a programming language.

The user interface of the builder (156) may include editor features and sub-systems. The editor features may include editors for modifying various aspects or views of the web application design, a builder user interface to assist in the development of the web application design in accordance with one or more embodiments of the technology. For example, the editors may include business objects, document, case, search, reports, pages, roles, app, widgets, and process editors. The builder user interface may include a new artifact wizard, add-on top-level menu, add-on tool bar buttons, context menus, artifacts properties page, and a model editor.

The builder (156) also includes functionality to create the web application executable (158) from the web application design (110). In other words, the builder constructs the instructions for the web application executable from the web application design that is created using a drag and drop framework in accordance with one or more embodiments of the technology. The builder (156) may include components and functionality to perform artifact management, validate the web application, generate code, package and deploy the web application. The builder (156) may also include components functionality to perform source control and project/library management.

While FIG. 1 shows a configuration of components, other configurations may be used without departing from the scope of the technology. For example, various components may be combined to create a single component. As another example, the functionality performed by a single component may be performed by two or more components.

Figure 2:
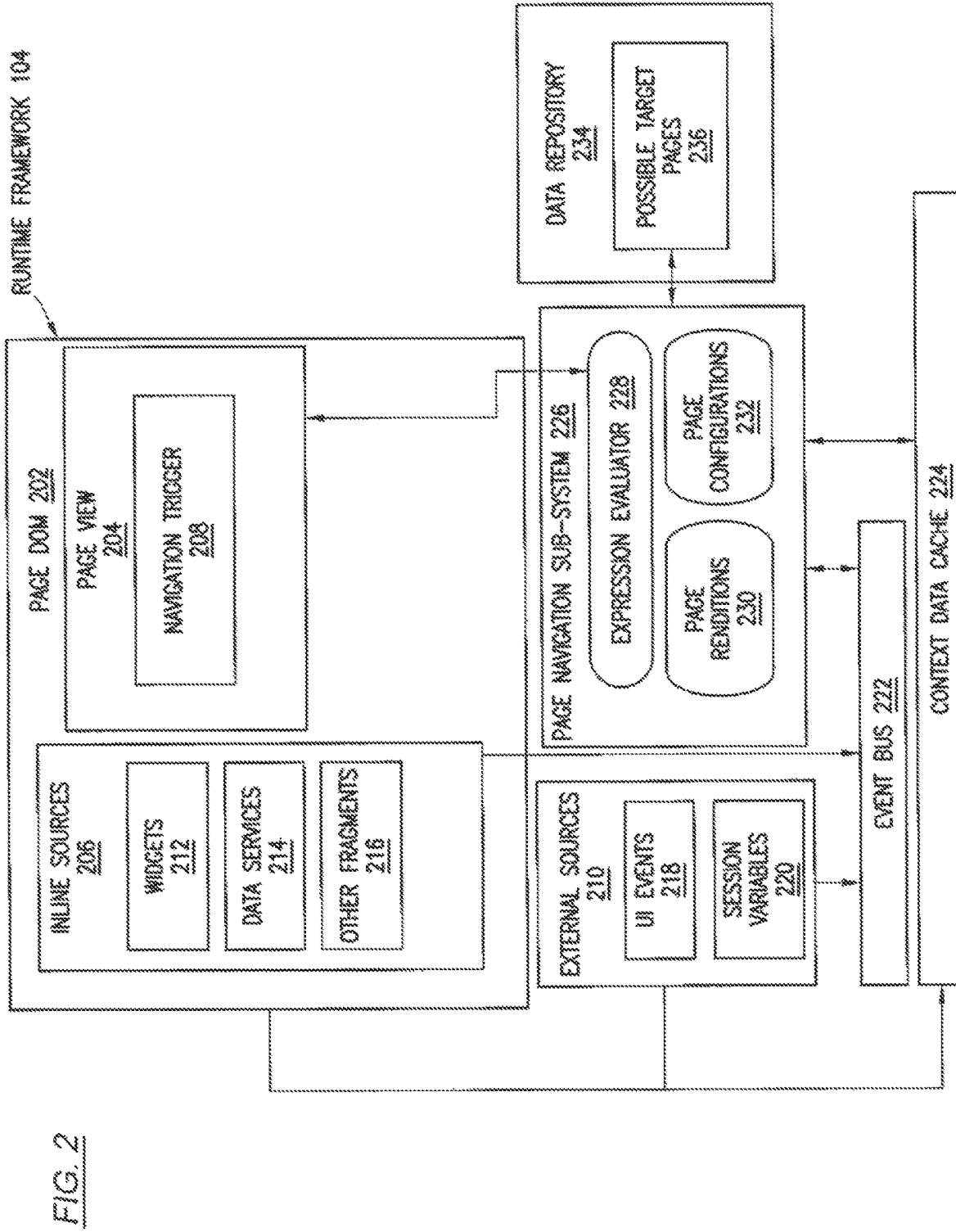

FIG. 2 shows a schematic diagram of a runtime framework (104) in accordance with one or more embodiments of the technology. As shown in FIG. 2, the runtime framework (104) includes a page document object model (DOM) (202). The page DOM (202) is a model for representing and interacting with a particular page of an application. The page DOM (202) defines a page view (204) and inline sources (206). The page view (204) is a view of an application page. The page view (204) includes a navigation trigger (208). For example, the navigation trigger (208) may be a button or other selectable user interface component that, when selected by a user, triggers a navigation to a target page. In one or more embodiments of the technology, selection of the navigation trigger triggers the execution of code that defines a target page for navigation. In one or more embodiments of the technology, the code includes an expression specifying one or more data sources. The data sources that may be specified by the expression include inline sources (206) defined within the page DOM (202) or external sources (210).

Inline sources (206) may include widgets (212), data services (214), and other fragments (216). A widget (212) is an object on the page, such as a text field, a check box, radio button, tab, and other such user interface elements. Data services (214) are sources of end user data, such as data gathered from the end user and/or a data repository in one or more embodiments of the technology. Other fragments (216) include the output of fragments on the page.

External sources (210) are sources that exist outside of the page DOM (202). For example, external sources (210) may include user interface (UI) events (218) and session variables (220). UI events (218) may include the various interactions between a page and an end user. For example, a UI event may include a start of submission of data, a selection of a navigation trigger, a switching to another field, or another event. Session variables (220) may be the same or similar to the session variables discussed above with reference to FIG. 1. Further, session variables may also be referred to as session parameters.

The page DOM (202) and external sources (210) may be connected to a context data cache (224). The context data cache (224) is a cache for locally storing data from the data sources (e.g., inline sources (206), external sources (210)).

An event bus (222) is a bus for transferring events to the page navigation sub-system (226). In other words, the triggering of an event is managed by the event bus (222), which triggers execution of the page navigation sub-system (226).

The page navigation sub-system (226) is a software sub-system that is configured to select and serve the target page. Specifically, the page navigation sub-system (226) includes an expression evaluator (228), page renditions (230), and page configurations (232). The expression evaluator (228) includes functionality to evaluate the expression defined for the navigation trigger (208). Specifically, the expression evaluator (228) includes functionality to gather data from the data sources and/or context data cache and evaluate the expression.

The page renditions (230) are software components that are configured to generate or otherwise obtain a version of the target page for the particular end user device. Specifically, a target page may have multiple versions. Each of the multiple versions may be defined for a particular device, display size, type of device, or other attribute of the device. The page renditions (230) include functionality to determine the attribute of the device defining the particular version and generate or acquire the version of a target page for the attribute.

The page configurations (232) includes functionality to maintain a mapping between the page identifiers of target pages and the file having the target page. In other words, the result of evaluating the expression may be a page identifier. The page identified may not identify a virtual or physical storage location of the target page in accordance with one or more embodiments of the technology. The mapping relates the page identifiers to the corresponding storage locations.

In one or more embodiments of the technology, the page navigation sub-system (226) is connected to a data repository (234). In one or more embodiments of the technology, the data repository (234) is any type of storage unit and/or device (e.g., a file system, database, collection of tables, or any other storage mechanism) for storing data. Further, the data repository (234) may include multiple different storage units and/or devices. The data repository (234) includes functionality to store possible target pages (236). Possible target pages (236) are the set of pages from which a target page may be selected based on the evaluation of the expression. In other words, the possible target pages are different pages from which the target page may be selected and, in which the result of the evaluation of the expression determines the selection. In one or more embodiments of the technology, possible target pages are not merely different versions of the same target page, where each version is for a different type of device. Rather, the possible target pages are different pages entirely. In other words, a version of each of the possible target pages may be displayed on the same end user device.

Figure 3:
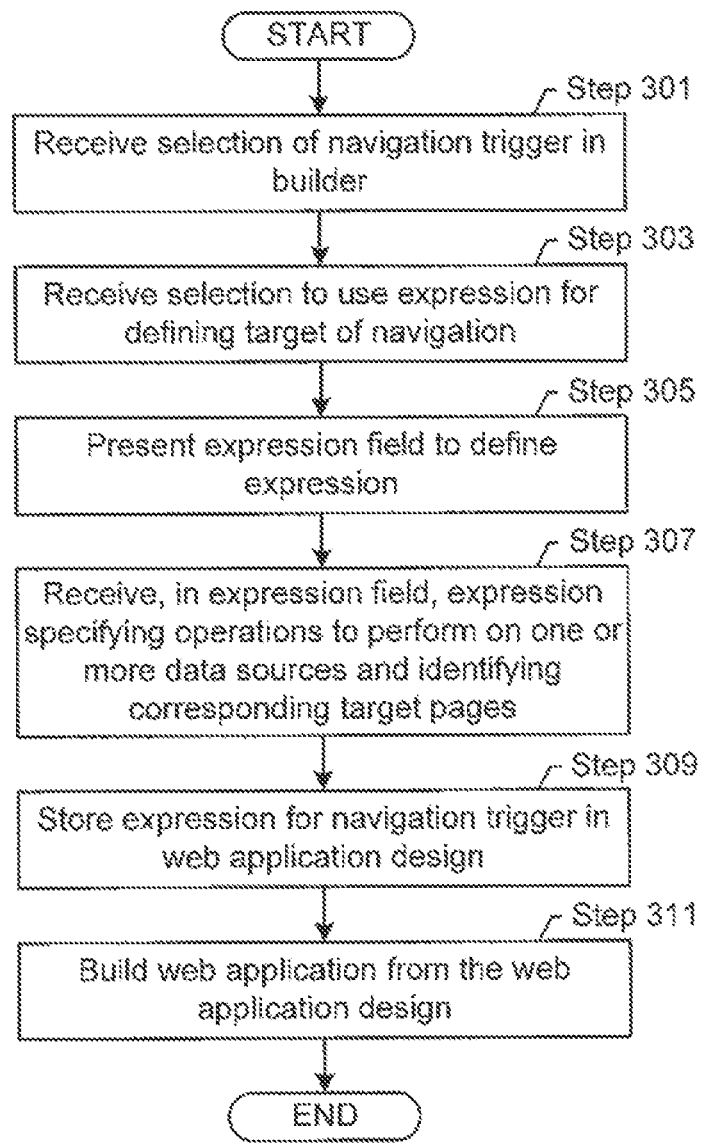
FIGS. 3 and 4 show example flowcharts in accordance with one or more embodiments of the technology.
Figure 4:
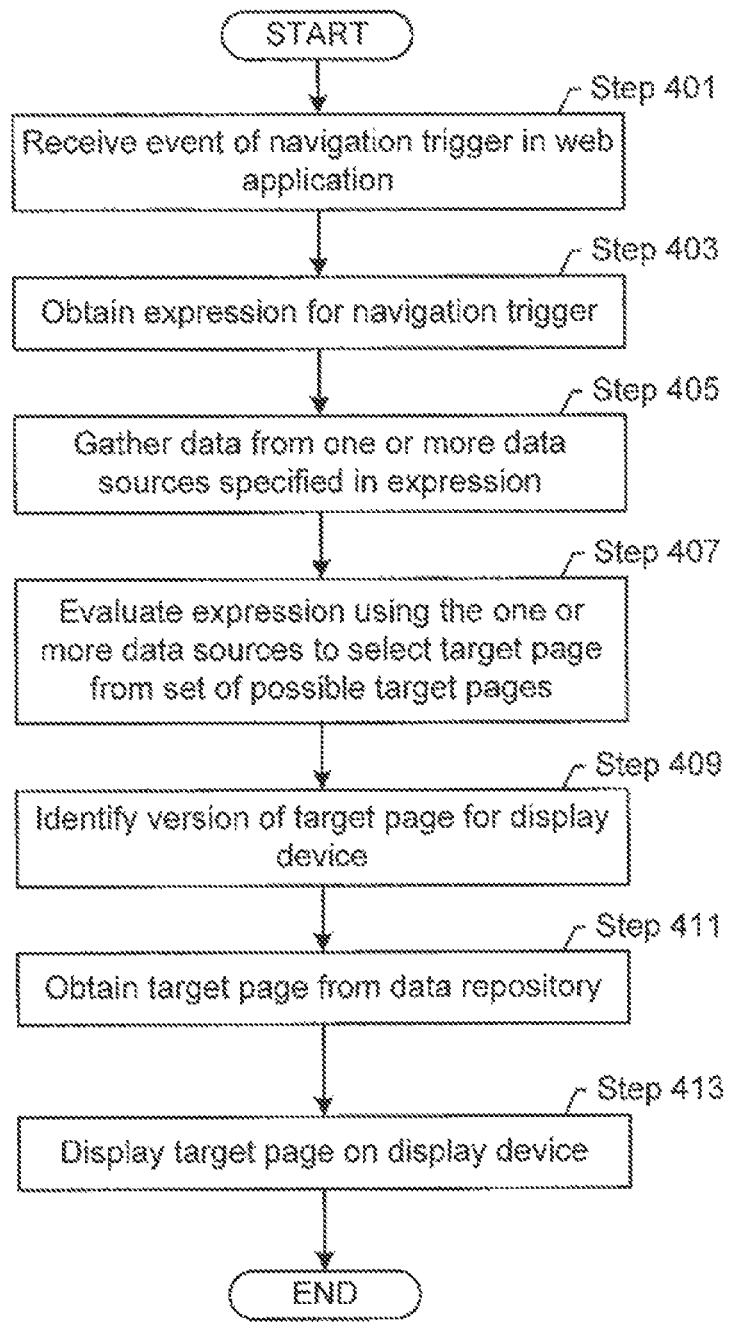

FIGS. 3 and 4 show flowcharts in accordance with one or more embodiments of the technology. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 3 shows a flowchart in accordance with one or more embodiments of the technology. FIG. 3 may be performed by one or more of the components shown in FIG. 1. In FIG. 3, in Step 301, a selection of a navigation trigger is received in the builder in accordance with one or more embodiments of the technology. For example, the developer may drag and drop the navigation trigger from a template set of navigation triggers to a particular location on the page. As another example, the developer may select, in the developer interface, the navigation trigger. In response, the builder may display an editor for configuring the navigation trigger.

In Step 303, a selection to use an expression for defining the target of the navigation is received in accordance with one or more embodiments of the technology. In one or more embodiments of the technology, the developer may select to use a statically defined target page or an expression. Any mechanism for the developer to select an expression may be used without departing from the scope of the technology. Although not shown in FIG. 3, if the developer selects to use a statically defined target page, then the developer may submit a page identifier in a field or select the page from a list of pages.

In Step 305, an expression field is presented to define the expression in accordance with one or more embodiments of the technology. In one or more embodiments of the technology, one or more expression fields are displayed for the developer. The expression field(s) may be text boxes, drop down boxes, and other user interface elements for the submission of data.

In Step 307, in the expression field, an expression specifying one or more operations to perform on one or more data sources and identifying corresponding target pages is received in accordance with one or more embodiments of the technology. The developer provides an expression using the displayed fields. In one or more embodiments of the technology, the creation of the expression may be interactive between the builder and the developer. In other words, the expression field(s) may be dynamically displayed in order to generate the expression. For example, the developer may select, from a list of available operations, an operation. In response, the number of fields corresponding to the number of operands that the operation uses may be displayed with text indicating types of acceptable data sources for the particular operation. In the example, if the operation selected by the developer uses two operands, then the builder may display two fields; alternatively, if the operation uses one operand, then the builder displays a single field.

In Step 309, the expression for the navigation trigger is stored in the web application design in accordance with one or more embodiments of the technology. In one or more embodiments of the technology, the builder stores the expression as part of the web application design. Thus, the developer may continue to edit the web application. While the developer is editing the web application, the builder may perform library management, source control, and any other management of the web application.

In Step 311, the web application executable is built from the web application design in accordance with one or more embodiments of the technology. Specifically, when the developer has completed developing the web application, the builder creates the web application executable from the web application design. Creating the web application executable may include translating the developer created expression for the navigation trigger into an expression in source code and then translating the source code form of the expression into object code or other executable. Alternatively, the developer created expression may be translated directly into the executable.

FIG. 4 shows a flowchart for an end user in accordance with one or more embodiments of the technology. FIG. 4 may be performed using the runtime environment shown in FIG. 2. In Step 401, an event of a navigation trigger is received in the web application in accordance with one or more embodiments of the technology. In one or more embodiments of the technology, the end user selects the navigation trigger while the web application is executing and a page is being displayed. For example, the selection of the navigation trigger may be that the end user selects a button, a tab, or other trigger in the application page.

In response to the selection, an expression is obtained for the navigation trigger in Step 403. Specifically, the selection triggers the browser to execute the code for the navigation trigger where the code embodies the expression.

In Step 405, data from one or more data sources specified in the expression is gathered. In one or more embodiments of the technology, the expression may reference inline data sources and/or external data sources. In response, the data is obtained from the referenced data sources. For example, the data may be obtained by accessing a data repository to identify user data, the values of session variables, and/or the values of fields within the page.

In Step 407, the expression is evaluated using the one or more data sources to select a target page from the set of possible target pages. Specifically, the one or more operations specified in the expression are performed. For example, the operations may be to access different data sources and compare the data obtained. The result of the comparison may be a target page specified by the expression. Another example operation may be to receive an instruction or command in another field of the current web page and execute the instruction in the command.

By way of a more concrete example, consider the scenario in which a developer would like a user to navigate to a first target page if the user is a first class of user and to a second target page if the user is a second class of user. In other words, not only does the data on the page change between the first web page and the second web page, but the entire web page changes. In such a scenario, the expression may be to obtain the user identifier from a session variable, access a database to determine the class of user corresponding to the user identifier, and execute a conditional operation in which if the class of user is the first class, then navigate to the first target page and, if the user is a second class, then navigate to a second target page.

In Step 409, the version of the target page for the display device is identified in accordance with one or more embodiments of the technology. In one or more embodiments of the technology, the attribute of the end user device that dictates the version of the target page to display is obtained. For example, the attribute may be obtained from session variables or one or more other data sources. Based on the attribute, the version of the target page is identified.

Continuing with FIG. 4, in Step 411, the target page is obtained from the data repository in accordance with one or more embodiments of the technology. In one or more embodiments of the technology, the result of evaluating the expression is a page identifier of the selected target page. For example, the browser, after evaluating the expression, may send a request to a backend server with the page identifier. In response, the backend server may identify the version as described in Step 409 and obtain the target page from the data repository.

In one or more embodiments of the technology, the obtaining of the target page and identifying the version may be performed in virtually any order. For example, after the target page is obtained from the data repository, the target page may be rendered according to the display device. By way of another example, the backend server may obtain the version from the data repository after identifying the version to obtain.

In Step 413, the target page is displayed on the display device. The target page is presented to the user. Thus, the user may continue to use the web application in accordance with one or more embodiments of the technology.

As shown above, the selection of the navigation trigger causes the evaluation of the expression that is within the code of the navigation trigger. In other words, rather than a redirection from the target page of the navigation trigger, the code of the navigation trigger itself defines which of multiple target pages to access. Consequently, in one or more embodiments of the technology, the next immediate page that is served to the browser after the web page that has the navigation trigger is the appropriate target page, which is selected from the set of possible target pages.

Figure 5:
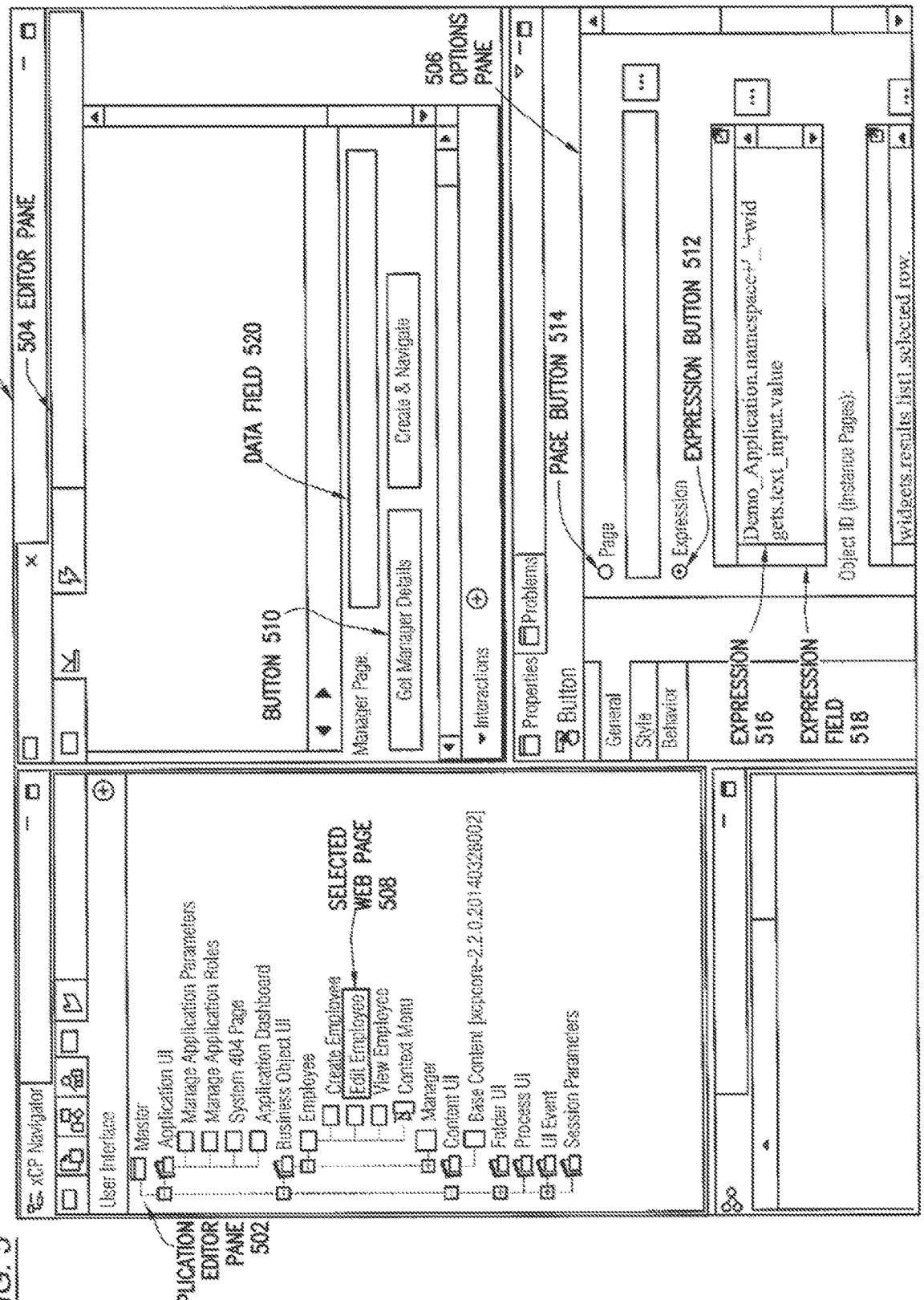

FIG. 5-7 shows an example in accordance with one or more embodiments of the technology. The following example is for explanatory purposes only and not intended to limit the scope of the technology.

Turning to FIG. 5, FIG. 5 shows an example builder user interface (500). The example interface shown in FIG. 5 is an example of the interface of the development environment shown in FIG. 1, when at least some of the Steps shown in FIG. 3 are performed. As shown, the builder user interface (500) may include multiple panes or divisions of the interface including an application editor list pane (502), an editor pane (504), and an options pane (506).

The application editor list pane (502) presents the various aspects of the web application that the developer may edit by selecting the appropriate editor. As shown in the application editor list pane (502), a developer may access the application master, the application user interface editor, and the business object user interface editor, content user interface editor, folder user interface editor, process user interface editor, user interface editor, and session parameter editor. Within the business object user interface, the developer may access the employee definition web pages and select a particular web page (508). The selected webpage is the edit employee web page.

In one or more embodiments of the technology, in response to the selection within the business object user interface editor, the builder user interface (500) displays, in the editor page (504), the business object user interface editor. The business object user interface editor displays the edit employee web page per the selected web page (508). Continuing with the example, consider the scenario in which the developer selects the get manager details button (510) within the editor view page (504).

In response to selecting the get manager details button (510), the builder user interface (500) displays, in the options pane (506), the options for the get manager details button (510). From the options, the developer may select the expression button (512) to use an expression to select a page from a set of possible target pages rather than the page button (514) to reference a static page. The developer may further enter an expression (516) in the expression field (518). The expression (516), in the example, refers to data field (520) on the same page as the get manager details button (510). In other words, the data field (520) is the data source. After generating and editing the web application design, the builder may generate a web application executable from the web application design. The web application executable may be released for use by the end users.

FIGS. 6 and 7 show an example of an end user using the web application created by the developer in FIG. 5. Specifically, FIG. 6 shows an example of the selected web page (508) in use. A runtime environment, such as the runtime environment shown in FIG. 2, may assist manage the navigation shown in FIGS. 6 and 7 by performing the Steps shown in FIG. 4. In FIG. 6, the end user selects the entry corresponding to employee "Sheetal" (602), and enters "edit_manager" in data field (520). The end user may then select the get manager details button (510), which corresponds to the navigation trigger. In response, the runtime environment evaluates the expression for the get manager details button, which is to access the target web page referenced by the data field (520) for the entry (602). FIG. 7 shows the resulting target page (700) that is displayed to the end user. As shown, the resulting target page allows the end user to edit the manager's details.

The following are two example expressions in accordance with one or more embodiments of the technology. The following are for example purposes only and not intended to limit the scope of the technology.

In the first example, consider the scenario in which the expression is evaluated to select the related object page. In this case, employee is related to Department. In the view page of Employee, using the expression below, an end user may dynamically navigate to the related instance of the department view page.

Example 1

```
1)  Expression as Defined by the Developer:
2)    Page: Demo_Application.namespace+'_'+ 'view_department'
3)    Object ID: employee.department.department.id
4)  Generated Expression Executable for web page:
5)    Page: "dapp_view_employee_xcp_gotopage_redirectPageUrlName_1"
6)      xcp.expression.Generated.addFunction("dapp_view_employee_xcp_
          gotopage_redirectPageUrlName_1", "function (context) {
          returnthis.getValueFromAppContext(context,'namespace') + '_' +
          'view_department'; }");
7)    Object ID: "dapp_view_employee_xcp_gotopage_redirectObjectId_1"
8)      xcp.expression.Generated.addFunction("dapp_view_employee_xcp_
          gotopage_redirectObjectId_1", "function (context) {
          returnthis.getValueFromModel(context,'dapp_employee',
          'department.child.id'); }");
9)  Function signature:
10)   Page: function (context) {
          returnthis.getValueFromAppContext(context,'namespace') + '_' +
          'view_department'; }
11)   Object ID: function (context) {
          returnthis.getValueFromModel(context,'dapp_employee','department.child.id'); }
```

In Example 1, line 2 shows an expression created by the developer to get a page name. Line 3 shows an expression created by the developer to get the page object identifier. Line 5 is a generated JavaScript function for the page expression in line 2. Line 6 is a call to add the generated JavaScript function to the expression function registry. In line 6, dapp_view_employee_xcp_gotopage_redirectPageUrlName_1 is the function name and "function (context) { return this.getValueFromAppContext(context, 'namespace') + '_' +'view_department';}" is the function body. Lines 7 and 8 are the page object identifier function generated from line 3. Lines 9-11 are the function signatures generated for the expression defined by the developer in lines 1-3.

Example 2 is an example for selecting the target page based on role. In particular, the following expression dynamically redirects to a particular page based on what role the end user has selected. If an end user is logged in as "contributor," then the expression would redirect to the "Edit" page of the employee. If the end user changes role to "reader," then the same button with the following expression selects the "View" page of employee. If the end user is not part of any roles, then the expression selects the Employee listing page.

Example 2

```
1)  Expression as defined by the developer:
2)    Page:
3)        ifThenElse(Demo_Application.user.currentUserRoleLabel==
            'contributor','dapp_edit_employee',(ifThenElse(Demo_Application.user.
            currentUserRoleLabel=='Reader','dapp_view_employee','dapp_employee')))
4)    Object ID: widgets.results_list.selected_row.id
5)  Generated Expression for web page:
6)    Page: "dapp_view_employee_xcp_gotopage_redirectPageUrlName_1"
7)      xcp.expression.Generated.addFunction
          ("dapp_rolebasedredirectio_xcp_gotopage_redirectPageUrlName_1",
          "function (context) { return
          xcp.functions.ifThenElse(this.getValueFromUserContext(context,
          'currentUserRoleLabel') == 'contributor', 'dapp_edit_employee',
          (xcp.functions.ifThenElse(this.getValueFromUserContext(context,
          'currentUserRoleLabel') == 'Reader', 'dapp_view_employee',
          'dapp_employee')));}");
8)    Object ID: "dapp_rolebasedredirectio_xcp_gotopage_redirectObjectId_1"
9)      xcp.expression.Generated.addFunction("dapp_rolebasedredirectio_xcp_
          gotopage_redirectObjectId_1", "function (context) { return
          this.getValueFromSelectionModel(context,'results_list','id'); }");
10) Function signature:
11)   Page: function (context) { return
12)     xcp.functions.ifThenElse(this.getValueFromUserContext(context,
          'currentUserRoleLabel') == 'contributor', 'dapp_edit_employee',
          (xcp.functions.ifThenElse(this.getValueFromUserContext(context,
          'currentUserRoleLabel') == 'Reader', 'dapp_view_employee', 'dapp_employee')));
          }
13)   Object ID: function (context) { return
          this.getValueFromSelectionModel(context,'results_list','id'); }
```

In Example 2, line 3 is a role based page expression as defined by the developer. Line 4 is a page object identifier expression as defined by the developer. Lines 6 and 7 are the page expression function for the generated expression corresponding to the page expression defined by the developer in line 3. Lines 8 and 9 are the page object identifier expression for the generated expression corresponding to the page object identifier expression defined by the developer in line 4. Lines 10-13 are the function signatures corresponding to the generated expressions in lines 6-9.

Example 1 and Example 2 are for illustrative purposes only. Embodiments of the technology are not limited to these examples.

Figure 8:
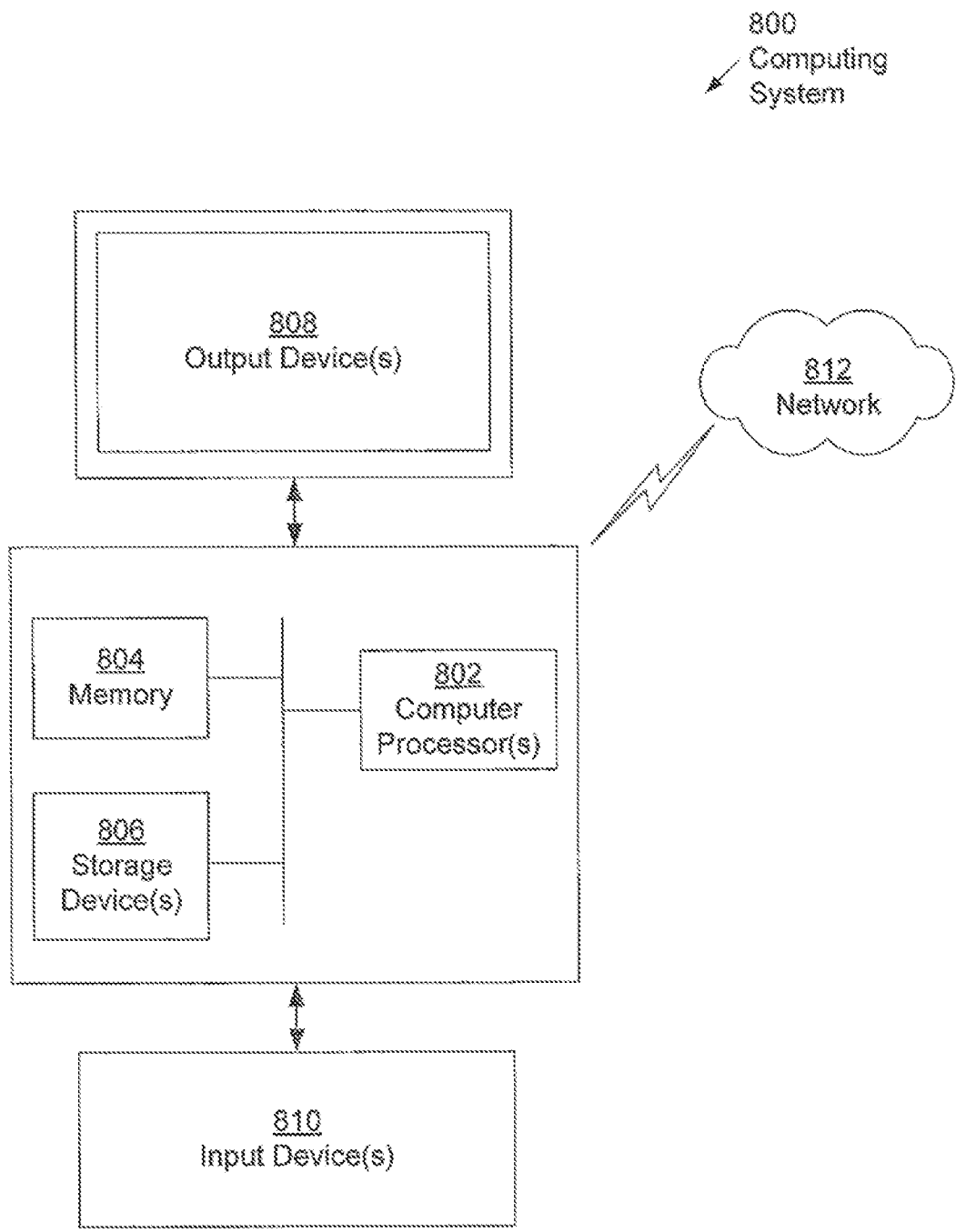
FIG. 8 shows a computing system in accordance with one or more embodiments of the technology.

Embodiments of the technology may be implemented on a computing system. Any combination of mobile, desktop, server, embedded, or other types of hardware may be used. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (800) may be located at a remote location and connected to the other elements over a network (814). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method of navigation control comprising:
receiving a first page of a web application, the first page of the web application including a user selectable user interface component and an expression associated with the user selectable user interface component, the expression specifying a data source that is external to the expression and an operation to select a target page from a set of possible target pages;
receiving an event based on a user selecting the user selectable user interface component; and
responsive to the event, navigating to a second page from the first page, wherein navigating to the second page comprises:
while the first page is displayed, dynamically determining the second page to which to navigate from the first page, wherein dynamically determining the second page comprises:
obtaining the expression used to determine the second page using a browser to execute code for the user selectable user interface component, wherein the code embodies the expression;
determining from the expression, the data source specified in the expression;
gathering data from the data source specified in the expression, wherein the data includes a user class of a plurality of user classes; and
evaluating the expression, wherein evaluating the expression comprises performing the operation using the user class to select the second page from the set of possible target pages; and
requesting the second page from a server as a next page after the first page.

2. The method of claim 1, wherein the first page comprises a document object model (DOM) that defines a page view, wherein the page view includes the user selectable user interface component.

3. The method of claim 2, wherein the DOM defines an inline source and wherein the data source is the inline source.

4. The method of claim 3, wherein the data source is a text field.

5. The method of claim 3, wherein the data source is a control selected from a group consisting of a checkbox and a radio button.

6. The method of claim 2, wherein the data source is external to the DOM of the first page.

7. The method of claim 6, wherein the data source is a user interface event.

8. The method of claim 6, wherein the data source is a session variable.

9. The method of claim 2, further comprising:
storing the data from the data source in a context data cache connected to the DOM, wherein gathering the data from the data source specified in the expression comprises gathering the data from the data source from the context data cache.

10. The method of claim 1, wherein the expression comprises an identification of the set of possible target pages and a result that triggers each possible target page in the set of possible target pages.

11. The method of claim 1, wherein the operation is a conditional operation that specifies a first target page when the data from the data source has a first value and a second target page when the data from the data source has a second value.

12. A method of navigation control comprising:
based on user interaction with a graphical user interface, receiving a selection of a navigation trigger;
receiving an expression for the navigation trigger via the graphical user interface, the expression executable to select which of multiple possible target pages to access, the expression specifying a data source that is external to the expression and an operation to perform:
storing the expression for the navigation trigger in a web application design;
automatically generating a web application from the web application design, the web application executable for:
providing a first page to an end-user device, the first page comprising instructions for:
receiving an event of the navigation trigger while the web application is executing and the first page of the web application is being displayed;
in response to the event, obtaining the expression used to determine a second page for the navigation trigger using a browser to execute code for a user selectable user interface component, wherein the code embodies the expression;
gathering data from the data source specified in the expression, wherein the data includes a user class of a plurality of user classes;
evaluating the expression to determine a target page identifier, evaluating the expression comprising performing the operation using the user class; and
sending the target page identifier from the end-user device to a server; and
receiving the target page identifier from the end-user device; and
responsive to receiving the target page identifier, selecting a target page associated with the target page identifier to return to the end-user device; and
serving the target page to the end-user device.

13. The method of claim 12, wherein the web application further comprises code executable for:
obtaining an attribute of the end-user device; and
determining a version of the target page to return based on the attribute of the end-user device, wherein serving the target page to the end-user device comprises serving the version of the target page.

14. The method of claim 12, wherein the web application comprises code executable for providing a document object model (DOM) of the first page, the DOM defining a view of the first page, wherein the view of the first page includes the navigation trigger as a user selectable interface component.

15. The method of claim 14, wherein the DOM defines an inline source and wherein the data source is the inline source.

16. The method of claim 15, wherein the data source is a text field.

17. The method of claim 14, wherein the data source is external to the DOM of the first page.

18. The method of claim 17, wherein the data source is a user interface event.

19. The method of claim 17, wherein the data source is a session variable.

20. The method of claim 14, the first page comprising instructions:
storing the data from the data source in a context data cache connected to the DOM, wherein gathering the data from the data source specified in the expression comprises gathering the data from the data source from the context data cache.

21. The method of claim 12, wherein the expression comprises an identification of each of the multiple possible target pages and a result that triggers each possible target page from the multiple possible target pages.

22. The method of claim 12, wherein the operation is a conditional operation that specifies a first target page when the data from the data source has a first value and a second target page when the data from the data source has a second value.

* * * * *